United States Patent [19]
Balha

[11] 3,994,505
[45] Nov. 30, 1976

[54] SHOPPING CART

[75] Inventor: Frances R. Balha, Grandview, Mo.

[73] Assignee: Lock-A-Cart, Inc., Wilmington, Del.

[22] Filed: Aug. 28, 1975

[21] Appl. No.: 608,582

[52] U.S. Cl. .......................... 280/33.99 C; 188/21; 280/79.3
[51] Int. Cl.² ........................................ B62B 5/04
[58] Field of Search .................. 188/19, 17, 20, 21; 280/33.99 C, 33.99 R, 47.34, 79.1, 79.2, 79.3

[56] References Cited
UNITED STATES PATENTS

| | | | |
|---|---|---|---|
| 2,958,537 | 11/1960 | Young | 280/33.99 C |
| 3,002,370 | 10/1961 | La Brie, Jr. | 280/33.99 C |
| 3,061,049 | 10/1962 | Bramley | 280/33.99 C |
| 3,174,768 | 3/1965 | Sanders et al. | 280/33.99 C |
| 3,651,894 | 3/1972 | Auriemma | 280/33.99 C |
| 3,701,396 | 10/1972 | House | 188/21 |
| 3,809,202 | 5/1974 | Tyszkiewicz | 280/33.99 C |

Primary Examiner—Philip Goodman
Assistant Examiner—David M. Mitchell
Attorney, Agent, or Firm—John A. Hamilton

[57] ABSTRACT

A shopping cart including a wheeled basket having a hinged cover and locks both for the cover and for the wheels. Mechanism is provided whereby the wheels are locked when the cover is open, and unlocked when the cover is closed, although the wheel lock may be operated manually if the cover is held open by overloading the cart. A key lock mechanism is provided for locking both the wheels and the cover in the event the user desires to leave the cart unattended.

8 Claims, 9 Drawing Figures

U.S. Patent  Nov. 30, 1976  Sheet 2 of 2  3,994,505
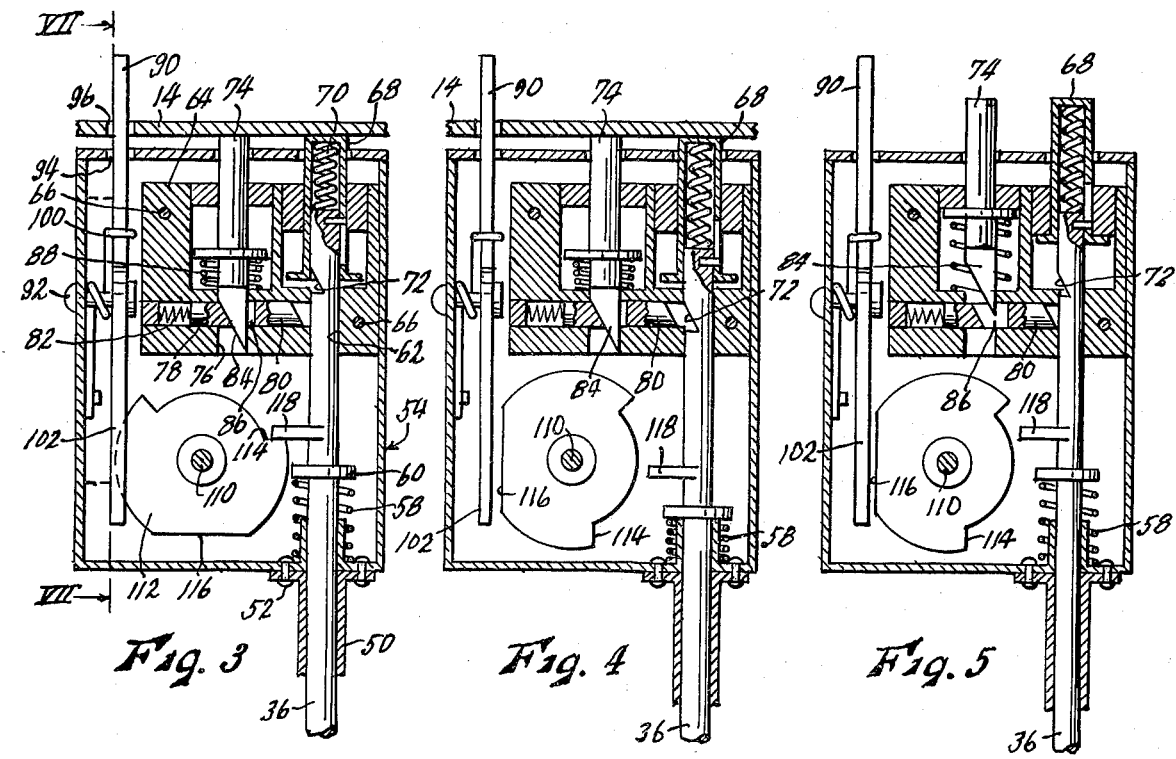
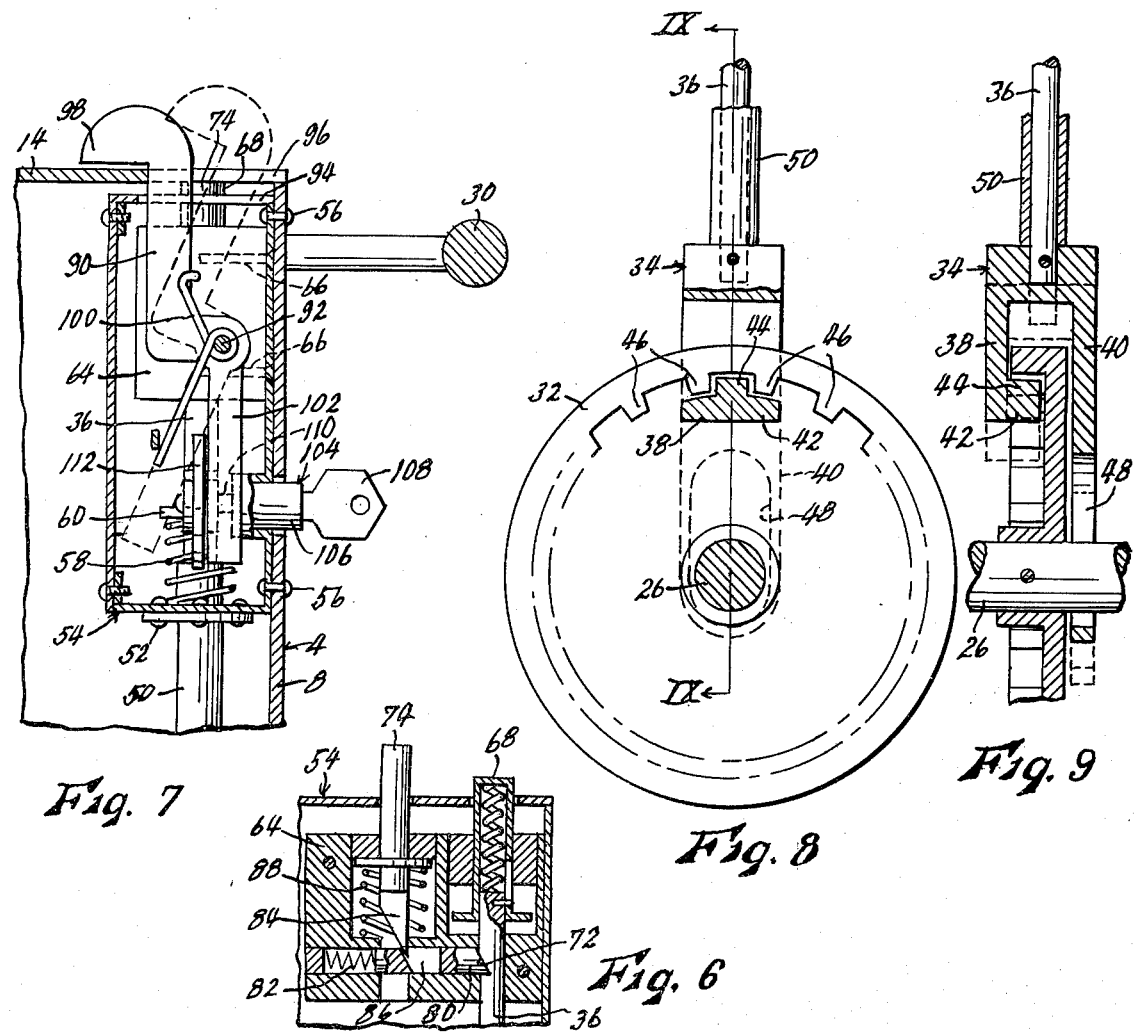

SHOPPING CART

This invention relates to new and useful improvements in shopping carts, and has as its principal object the provision of a shopping cart having new and novel features rendering it both more convenient in use, and also rendering it safer from theft, theft both of articles therefrom by sneak thieves, and also theft of the cart itself.

Almost everyone frequently uses shopping carts when shopping, said carts being furnished by retail establishments for the convenience of their customers, and thefts from such shopping carts are a constant problem. Such thefts are not prevalent within the confines of a single store, since the customer pays only for the goods in his cart when he passes through a check-out station, and even the thief must use the check-out lane to leave the store. However, the customer then customarily uses a cart to transport his purchases through a parking lot, often very large, to his automobile, and parking lot thefts from carts, or of the entire cart, are common. Also, within an enclosed shopping mall, a shopper often uses a cart to carry his purchases when walking from one store to another, and thefts of carts or their contents within the public areas are common, especially if the shopper should carelessly leave his cart unattended for any substantial period of time.

Another common difficulty encountered in the use of shopping carts results from the fact that they roll very freely on even the gentle slopes commonly encountered in parking lots, and even on sloping floors or ramps in shopping malls, and hence tend to "roll away" while the user is loading purchases therein, or unloading them.

The present shopping cart solves all of these difficulties in an effective yet convenient manner. It includes mechanism which functions normally to lock the wheels, thereby holding the cart stationary, whenever the basket cover is opened, and to unlock the wheels whenever the cover is closed. Thus the cart is held in a stationary position, even on sloping surfaces, for convenience in loading or unloading articles into or from the basket, and also locked against being wheeled away by a thief at a time when the user's attention may be diverted. When the cover is closed, the wheels are unlocked and the cart may be wheeled freely about. Even in this condition, the cover is held closed by a latch not freely accessible to a thief. For use in the event the basket should be over-filled to the extent that the cover cannot be fully closed, there is provided a separately operable manual means for locking and unlocking the wheels. For use in the event it should be necessary or desirable for the user to leave the cart unattended, there is provided a key lock which positively locks both the wheels and the cover.

Other objects are simplicity and economy of construction, and efficiency and dependability of operation.

With these objects in view, as well as other objects which will appear in the course of the specification, reference will be had to the accompanying drawing, wherein.

Figure 1:
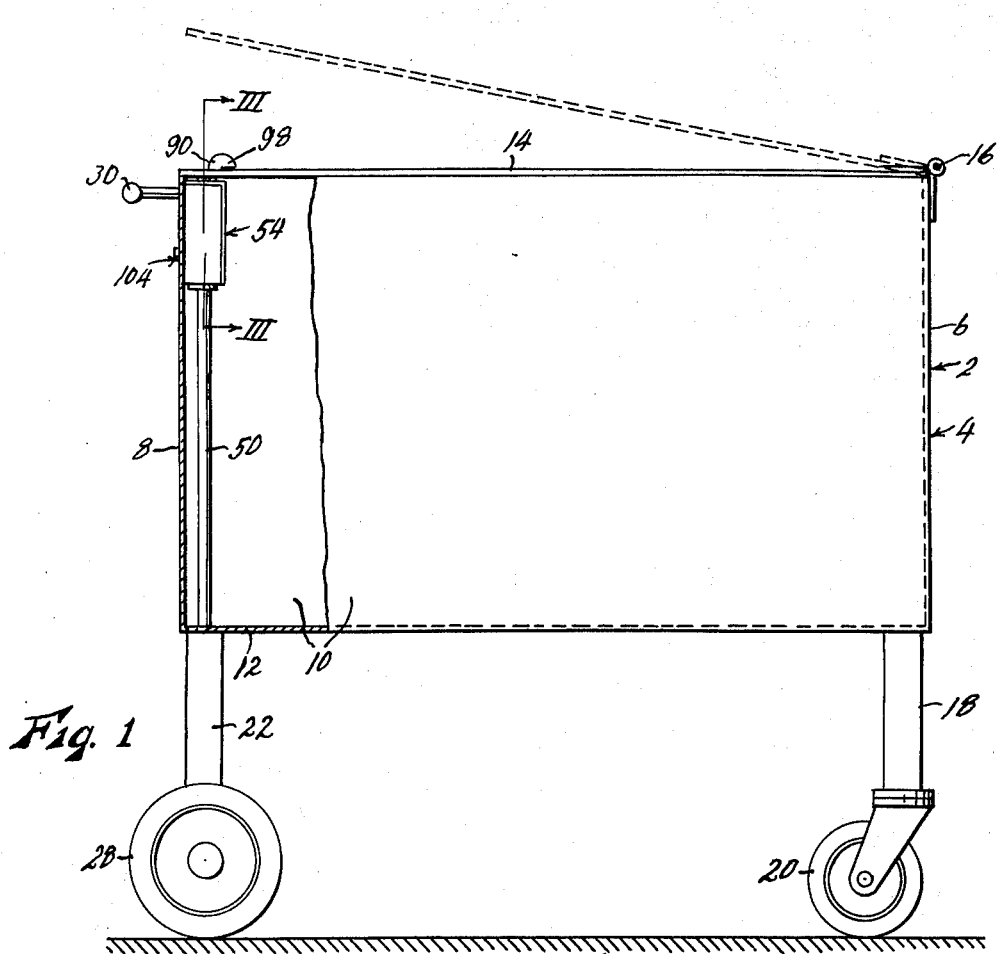
FIG. 1 is a side elevational view of a shopping cart embodying the present invention, with portions broken away.
Figure 2:
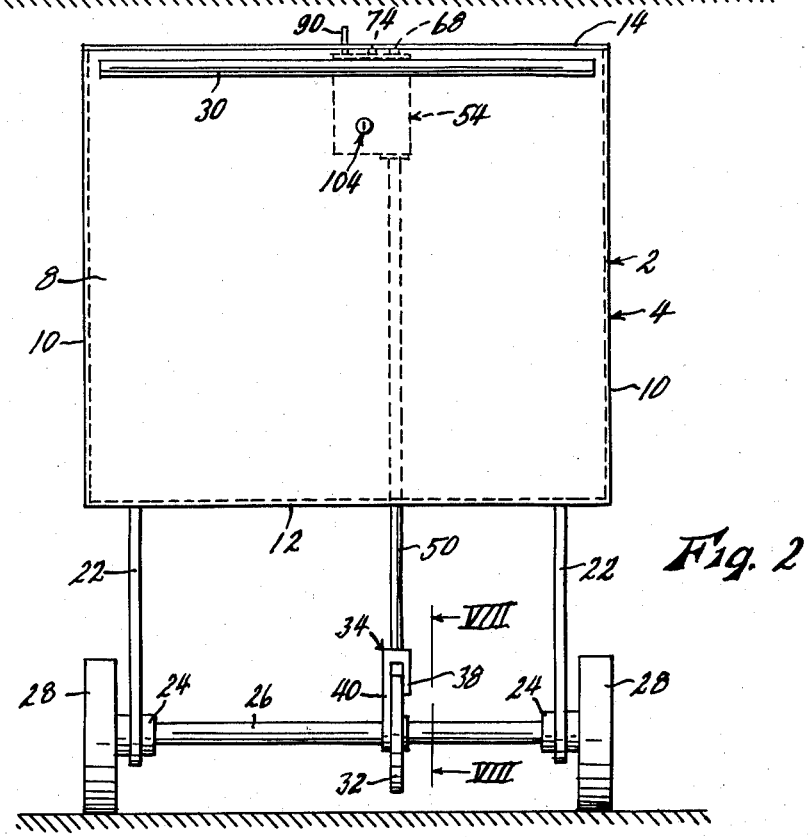
FIG. 2 is a rear elevational view of the cart as shown in FIG. 1.

FIG. 3 is an enlarged, fragmentary sectional view taken on line III—III of FIG. 1, showing the locking mechanism with its parts in the position assumed when the cover and wheels are locked by the key lock, FIG. 4 is a view similar to FIG. 3 with the parts in the position assumed when the key lock is released, but with the cover closed, FIG. 5 is a view similar to FIG. 4 with the parts in the position assumed when the cover is opened, FIG. 6 is a view similar to FIG. 5 with the parts in the position assumed when the wheels are unlocked with the cover opened, FIG. 7 is a fragmentary sectional view taken on line VII—VII of FIG. 3, showing the cover latch engaged in solid lines, and disengaged in dotted lines, FIG. 8 is an enlarged, fragmentary sectional view taken on line VIII—VIII of FIG. 2, and FIG. 9 is a fragmentary sectional view taken on line IX—IX of FIG. 8, showing the wheel lock engaged in solid lines, and disengaged in dotted lines.

Like reference numerals apply to similar parts throughout the several views, and the numeral 2 applies generally to a shopping cart as contemplated by the present invention, said cart including a generally rectilinear, open-topped basket 4 having a front wall 6, rear wall 8, side walls 10, and floor 12. These walls may be solid as shown, or may be of the more common wire mesh type, although the solid walls have the advantage of concealing the contents of the basket from potential thieves. The basket is provided with a planar cover 14 hinged at its forward edge to the top edge of front basket wall 6, as at 16, and which may be opened upwardly as shown in dotted lines in FIG. 1.

At each of its lower front corners, basket 4 is provided with a rigid depending leg 18 (one shown), at the lower end of which is mounted a castered ground-engaging wheel 20, the castering permitting steering of the cart. At each of its lower rear corners, the basket is provided with a rigid depending leg 22 having an axle bearing 24 at its lower end, the bearings rotatably carrying a horizontal transverse axle 26, to each of the opposite ends of which is affixed a ground-engaging wheel 28. Affixed to rear wall 8 of the basket, adjacent its upper edge, is an external handle 30, by means of which the cart may be manually propelled and steered.

Affixed concentrically on axle 26, intermediate its ends, is an internal gear 32. Bridging the upper edge of said gear is a unitary yoke 34 affixed to the lower end of a vertical lock rod 36. Said yoke includes a pair of vertically depending arms 38 and 40 disposed respectively at opposite sides of gear 32. The shorter arm 38 has at its lower end a horizontal extension 42 which projects within said gear and which carries an upstanding tooth 44 which, when the yoke is raised as shown in FIG. 8, engages between any successive pair of teeth 46 of the gear, thereby locking gear 32, axle 26 and wheels 28 against rotation, and securing the cart against rolling over the floor or ground engaged by the wheels. However, when the yoke 34 is lowered slightly, as indicated in dotted lines in FIG. 9, tooth 44 is freed from the teeth of gear 32, and wheels 28 can rotate freely. The longer arm 40 of yoke 34 is provided with a vertically elongated slot 48 through which axle 26 passes, and hence provides a brace preventing forward or rearward displacement of yoke 34 which might otherwise be permitted by the flexibility of lock rod 36.

Lock rod 36 is disposed slidably in a vertical tube 50 which projects upwardly from a point adjacent yoke 34, through floor 12 of basket 4, and upwardly through the basket, being affixed, as by rivets 52, to the bottom of a sheet metal box 54 which contains elements of the locking mechanism, said "lock box" being secured to rear wall 8 of basket 4, just beneath the upper edge thereof, as by rivets 56 or other suitable fasteners, (see FIG. 7). Lock rod 36 extends upwardly into box 54, and is biased upwardly, whereby to lock wheels 28 as already described, by a helical compression spring 58 encircling said rod and compressed between the floor of said lock box and a collar 60 affixed to the rod at a higher elevation. The lock rod extends upwardly and is engaged slidably in a vertical bore 62 formed through a block 64 affixed to the rear wall of box 54, adjacent the top thereof, by screws 66 or other suitable fasteners. Within said block, lock rod 36 is capped by a hollow tubular push button 68 which is vertically slidable on the lock rod to a limited degree, and which is biased upwardly relative to said lock rod by a compression spring 70 disposed therein. Spring 70 is substantially stronger and stiffer than spring 58. Push button 68 extends upwardly through an opening formed therefor in the top of box 54, normally to a level somewhat above the level of the top of cart basket 4, so as to be depressed by cover 14 whenever said cover is closed. A notch 72 forming an upwardly facing shoulder is formed in the side of the lock bar within block 64.

A rod-like release push button 74 is carried slidably in a vertical bore 76 of block 64 parallel to lock rod bore 62 at the side thereof toward which notch 72 of the lock rod is disposed. Bore 76 intersects a horizontal bore 78, which in turn intersects bore 62. Bore 78 carries a latch pin 80 slidably therein, which at the end thereof toward the lock bar forms a pawl engageable in notch 72 of the lock bar, to prevent said lock bar from rising. The latch bar is biased in a direction to engage the lock bar by a spring 82 carried in bore 78. Release button 74 is formed at its lower end to present a tapered finger 84 operable, when the release button is depressed, to enter a cooperative aperture 86 formed vertically through latch pin 80 to cam said latch pin away from the lock bar, against spring 82, thereby releasing said lock bar for upward movement. Release button 74 is biased to an elevation equal to the maximum elevation of push button 68 by a spring 88 carried within block 64, and is depressed, as is button 68, by closure of cover 14.

Disposed at one side of block 64 within box 54 is a cover latch bar 90, pivoted on a horizontal transverse rivet 92 secured in a side wall of box 54. Said latch bar extends upwardly through a slot 94 formed in the top wall of box 54 and through a notch 96 formed in cover 14 to extend forwardly from the rearward edge of said cover, and is provided at its upper end with a downwardly facing, forwardly projecting finger 98 which, when said latch bar is pivoted forwardly as shown in solid lines in FIG. 7, overlies the top surface of the cover forwardly of notch 96, thereby preventing said cover from being raised. Finger 98 may be pulled manually rearwardly, as shown in dotted lines in FIG. 7, whereby the cover is freed and may be raised. The cover latch is biased toward its engaged position by a clock spring 100 carried on pivot pin 92 of said latch bar. Latch bar 90 is also provided with an integral arm 102 extending downwardly from rivet 92.

A key lock mechanism indicated generally by the numeral 104 is also provided, and includes a lock cylinder 106 mounted in the rear wall of box 54, and projecting through an opening provided therefor in rear wall 8 of the cart basket, just below handle 30, so as to be easily accessible to a person pushing the cart for the insertion of a key 108. It will be understood that the turning of said key turns a forwardly projecting shaft 110 disposed within box 54, and a disc 112 affixed to the forward end of said shaft. By turning the key, disc 112 may be turned 90 degrees counter-clockwise to the position shown in FIG. 3, or 90 degrees clockwise to the position shown in FIGS. 4 and 5, and firmly locked in either position by withdrawal of key 108. This is a common arrangement well known in the art. Disc 112 is provided at one point of its periphery with a shoulder 114 facing in a counter-clockwise direction, and at another point of its periphery with a "flat" edge 116 which reduces its radius at that point. Flat 116 cooperates with arm 102 of the cover latch bar 90, and shoulder 114 cooperates with a laterally projecting finger 118 affixed to lock bar 36 below block 64, as will appear.

In operation, it will be seen that if, when cover 14 is closed and latched by finger 98 of latch bar 90, and push buttons 68 and 74 are depressed by cover 14, key 108 is turned to rotate disc 112 in a counterclockwise direction to the position shown in FIG. 3, shoulder 114 of said disc engages finger 118 of lock bar 36 and raises said lock bar against the pressure of spring 70 of push button 68. This elevates the lock bar, engaging tooth 44 of yoke 34 in the teeth of gear 32 to lock cart wheels 28 against rotation as previously described. Also, it will be seen that the left edge of disc 112, as viewed in FIGS. 3–6, then is disposed immediately forwardly of arm 102 of latch bar 90, so that said arm cannot move forwardly and finger 98 of said latch bar cannot be moved rearwardly to disengage it from cover notch 96, so that the cover is also locked. Thus FIG. 3 represents the fully locked condition of the cart, in which both the wheels and the cover are positively locked, so that upon withdrawal of key 108 to secure disc 112 in the position shown, the user of the cart may safely leave it unattended, at least for short periods of time, with no fear of theft of the cart itself, or from its contents.

Upon his returning to the cart, the user inserts key 108 and turns it to move disc 112 to position shown in FIGS. 4 and 5. Turning of the disc to this position withdraws disc shoulder 114 from finger 118, whereupon lock bar 36 is lowered by the pressure of spring 70, this spring being stiffer than spring 58, whereby wheels 28 are unlocked for free rotation, and also moves the "flat" 116 of disc 112 into alignment with arm 102 of cover latch bar 90, thereby freeing said arm for forward movement, and finger 98 of said latch bar for rearward movement, against the pressure of clock spring 100. This is the condition which would ordinarily prevail as the user pushes the cart about and remains in close attendance thereon, except when the cover is raised to place articles into or remove them from basket 4. In this condition, the cart may be wheeled freely about, but the cover 14 remains secured by finger 98 of the latch bar, though only with a "spring latch" effect which can be released manually by pulling said finger rearwardly. This finger, however, is closely adjacent the hands of the user if he is holding handle 30 to push the cart, and this proximity is sufficient to intimidate and discourage "snatch and grab" theives who might otherwise attempt to open the cover.

Whenever the user opens cover 14, after manually retracting cover latch finger 98 as just described, the parts assume the position shown in FIG. 5, that is, push buttons 68 and 74 are both elevated to their raised positions. Push button 68 is elevated by spring 58, which also raises lock bar 36 to lock wheels 28 as before. This is a convenience to the user in securing the cart against movement while he is loading or unloading the basket, in the event it is positioned on a sloping surface, and also prevents bodily theft of the cart at a time when the user's attention may be directed elsewhere. Push button 74, elevated by spring 88, frees latch pin 80 for movement toward lock bar 36 under the impetus of spring 82. Said latch pin, however, remains inoperative at this time, since if the push buttons are elevated simultaneously as when cover 14 is opened, notch 72 of the lock bar will have been raised above the pawl end of the latch pin before said latch pin is released by finger 84 of button 74, and the pawl end of the latch pin will not engage said notch, but slide operatively along the smooth side of the lock bar.

If the cart basket 4 should be so filled that its contents project above its top, cover 14 of course cannot be completely closed. Nevertheless, the user may still unlock wheels 28, normally unlocked by closure of the cover, simply by depressing push button 68, whereupon notch 72 of the lock bar is lowered to a position in alignment with latch pin 80, and the pawl end of said latch pin is snapped into engagement with said notch by spring 82, thereby locking said lock bar in its depressed position to unlock wheels 28, as shown in FIG. 6. The wheels may again be locked by depressing push button 74 manually, which causes finger 84 thereof to cam latch pin 80 out of engagement with lock bar notch 72, whereupon said lock bar is elevated by spring 58. Pushbuttons 68 and 74 are easily accessible to the user of the cart, and may be marked "Wheel Release" and "Wheel Lock" respectively. Of course, the wheels can be locked positively at any time, even if cover 14 is open, by inserting key 108 and turning disc 112 to its FIG. 3 position. This key action will of course also positively lock cover 14, if said cover is closed when the key is turned.

To preserve proper custody of key 108, it is contemplated that the present shopping cart be offered on a "rental" basis, the key to be delivered to the user at the time of rental, and returned to the lessor on return of the cart. However, this is of course a matter of choice.

While I have shown and described a specific embodiment of my invention, it will be readily apparent that many minor changes of structure and operation could be made without departing from the spirit of the invention.

What I claim as new and desire to protect by Letters Patent is:

1. A shopping cart comprising:
   a. an open-topped basket,
   b. ground-engaging wheels carried rotatably by and supporting said basket,
   c. a cover hinged to said basket and manually movable between open and closed positions respectively allowing and blocking access to the interior of said basket,
   d. a mechanical locking device operable when egaged to secure at least certain of said ground-engaging wheels against rotation, and
   e. manual operating means for selectively engaging and disengaging said locking device, said manual operating means being mechanically operable by said cover to engage said locking device when said cover is opened, and to disengage said locking device when said cover is closed.

2. A shopping cart as recited in claim 1 wherein said manually operable means includes a pair of manual push buttons, the first being operable when depressed to disengage said locking device, and the second being operable when depressed to engage said locking device, both of said push buttons being depressed simultaneously by said cover whenever said cover is closed, and with the addition of a mechanical interlock between said push buttons whereby said second button is rendered inoperative whenever it is depressed simultaneously with said first button.

3. A shopping cart as recited in claim 2 with the addition of a key mechanism operable by means of a removable key to move said locking device to, and to positively lock it in, its engaged position.

4. A shopping cart as recited in claim 2 wherein said push buttons are concealed within said basket when said cover is closed, but exposed when said cover is opened, whereby said locking device may be engaged and disengaged by manual manipulation of said push buttons whenever said cover is prevented from closing by overloading of said basket.

5. A shopping cart as recited in claim 1 with the addition of a manually operable spring latch operable when engaged to secure said cover in its closed position.

6. A shopping cart as recited in claim 5 with the addition of key mechanism operable by means of a removable key to secure said spring latch positively against release, whereby said cover may be positively locked in its closed position.

7. A shopping cart as recited in claim 5 wherein said key mechanism is also operable, when actuated to lock said spring latch, to move said locking device to, and positively lock it in its engaged position.

8. A shopping cart as recited in claim 4 with the addition of:
   a. a manually releasable spring latch normally securing said cover in its closed position, and
   b. a key mechanism operable by means of a removable key simultaneously both to move said locking device to, and lock it positively in, its engaged position, and also to lock said spring latch against release whenever said cover is closed.

* * * * *